March 9, 1965 G. C. FIELD 3,172,951

TELEVISION RECEIVER SYNCHRONIZING APPARATUS

Filed Aug. 22, 1961 2 Sheets-Sheet 1

INVENTOR
GORDON C. FIELD
BY– Smart & Biggar.
ATTORNEYS

March 9, 1965 G. C. FIELD 3,172,951

TELEVISION RECEIVER SYNCHRONIZING APPARATUS

Filed Aug. 22, 1961 2 Sheets-Sheet 2

INVENTOR
GORDON C. FIELD
BY- Smart & Biggar.
ATTORNEYS.

3,172,951
Patented Mar. 9, 1965

3,172,951

TELEVISION RECEIVER SYNCHRONIZING APPARATUS

Gordon C. Field, Belleville, Ontario, Canada, assignor to Northern Electric Company Limited, Montreal, Quebec, Canada Filed Aug. 22, 1961, Ser. No. 133,081
4 Claims. (Cl. 178—69.5)

Figures 1, 3:
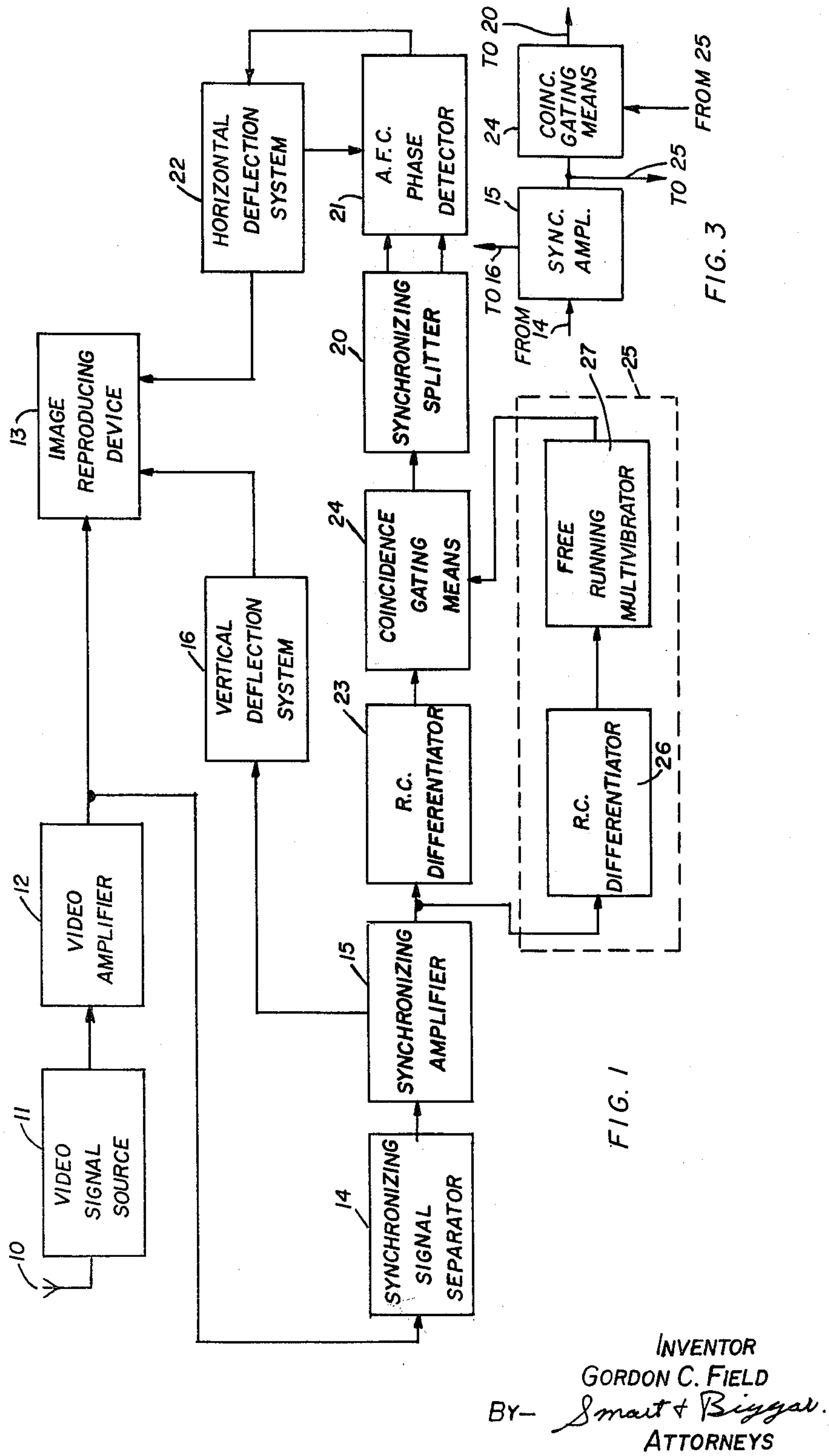

This invention relates to television receiver synchronizing apparatus and is adapted to be used in conjunction with a horizontal synchronizing control circuit for synchronizing the horizontal deflection system of a television receiver.

A television receiver synchronizing signal consists of a composite series of pulses including horizontal synchronizing pulses having a repetition rate of 15,750 cycles per second interspersed with serrations of vertical synchronizing pulses and equalizing pulses having a repetition rate of 31,500 cycles per second. The horizontal synchronizing pulses are transmitted at the end of each scanning line of the television picture and the vertical synchronizing pulses are transmitted at the end of each field of scanning lines. The equalizing pulses are transmitted for three lines preceding and for three lines following the serrations of the vertical synchronizing pulses. In an interlaced scanning system the equalizing pulses and the serrations of the vertical synchronizing pulses occur at half line intervals or at twice the horizontal synchronizing frequency starting one line after the last horizontal pulse in an even frame (or one half line after the last horizontal pulse in an odd frame) and ending one half line before the first horizontal pulse of the next frame in the case of an even frame (or one line before the first horizontal pulse in the case of an odd frame). Of these equalizing pulses and the serrations of the vertical synchronizing pulses, those which occur at one line intervals, in phase with the horizontal synchronizing pulses, serve to continue horizontal synchronization without interruption, while those which occur at the half line intervals between (out of phase with the horizontal synchronizing pulses) can produce an undesirable effect on the horizontal deflection system when applied to the horizontal synchronizing control circuit. This effect produces a slight warp or tearing at the top of the picture of the television receiver at the beginning of each field of the picture.

Prior to this invention, various attempts have been made to reduce this undesirable effect caused by the serrations of vertical synchronizing pulses and the equalizing pulses which are out of phase with the horizontal synchronizing pulses at the end of alternate fields. One method which has been proposed was to process the television synchronizing pulses so that the out of phase pulses had relatively small energy and were made to appear alike at the end of each field. Although this method served to reduce the undesirable effect caused by the out of phase pulses, the effect was not entirely eliminated because the out of phase pulses, however small in energy, were still present.

Applicant has discovered that by removing the out of phase pulses just prior to the application of the synchronizing pulses to the horizontal synchronizing control circuit, the undesirable effect caused by these out of phase pulses can be entirely eliminated. According to the invention, means are provided adapted to be responsive to a source of the composite synchronizing pulses to produce a first series of pulses occurring at the horizontal synchronizing repetition rate and being in phase with the horizontal synchronizing pulses of the source. A coincidence gating means adapted to be responsive at one input to the source and being responsive to the first series of pulses at another input produces at its output a second series of pulses occurring at the horizontal synchronizing repetition rate and being in phase with the horizontal synchronizing pulses of the source. The second series of pulses is then adapted to be applied to the horizontal synchronizing control circuit.

In a preferred embodiment of the invention, the source of composite synchronizing pulses is first differentiated before being applied to one input of the coincidence gating means. Each pulse of the second series of pulses thus produced is of equal duration and of small energy, which reduces the effect of non-uniform pulses on the horizontal synchronizing control circuit.

Another advantage of the present invention, is that the original synchronizing information is used, after being suitably processed to activate the horizontal synchronizing control circuit without the necessity of artificially generating pulses to be inserted in place of the incoming synchronizing information in the receiver.

The present invention has particular application where an automatic frequency control circuit including a phase detector is used as the horizontal synchronizing control circuit. In such an arrangement, the synchronizing information is added to a saw-tooth waveform derived from the horizontal deflection system. Normally, the presence of the out of phase pulses occurring on the reverse slope of the saw-tooth waveform produces an erroneous error voltage from the phase detector. This voltage alters the frequency of the horizontal oscillator of the horizontal deflection system during and immediately following the vertical synchronizing interval and produces a warp in vertical lines at the top of the picture. The amount of warp is directly related to the free running frequency of the horizontal oscillator which is determined by the setting of the horizontal hold control. By eliminating the out of phase pulses and suitably shaping the remaining synchronizing signal, a uniform series of pulses at the horizontal repetition rate is established. When this signal is impressed on the phase detector, there is no discontinuity in error voltage during the vertical synchronizing interval for any setting of the horizontal hold control within the hold range of the horizontal oscillator.

The means responsive to the source of composite synchronizing pulses comprises differentiating means for producing a series of triggering pulses and a conventional free running multivibrator responsive to the triggering pulses. The multivibrator is adapted to have a natural period slightly larger than one cycle of a series of pulses occurring at the horizontal synchronizing repetition rate.

Figure 2:
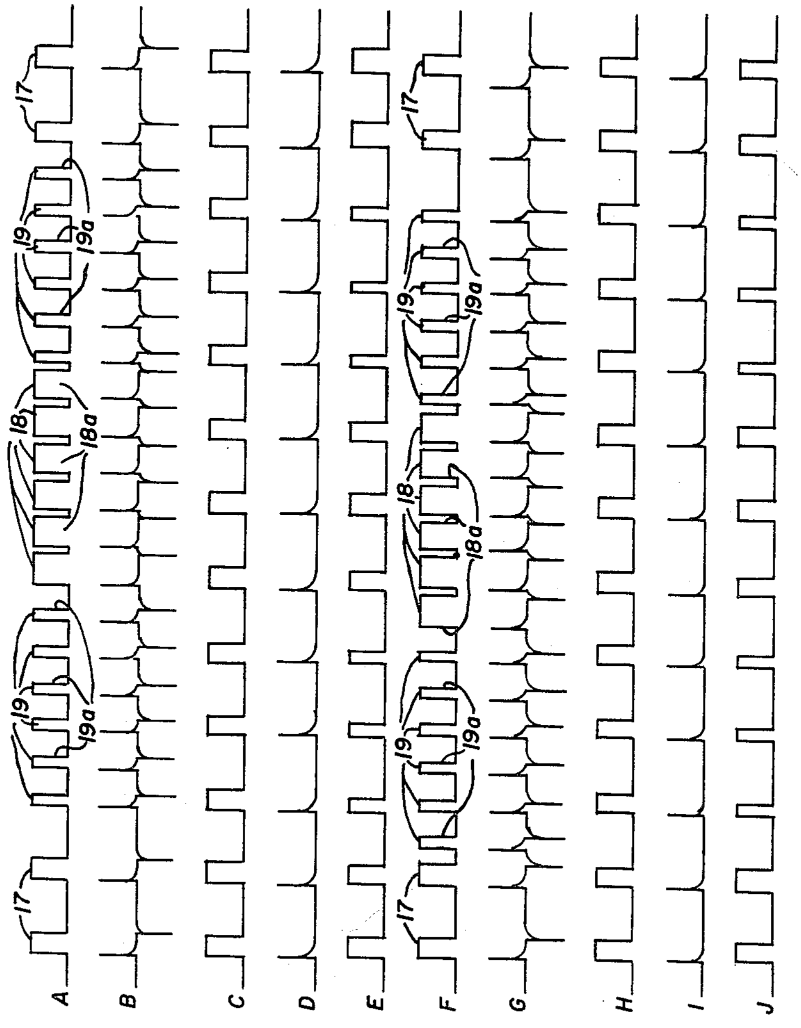

The embodiments of the invention will now be described, by way of example with reference to the accompanying drawings in which:

FIGURE 1 is a block schematic diagram illustrating one embodiment of the invention, FIGURE 2 is a series of waveforms for alternate scanning fields which assist in the understanding of the invention, and FIGURE 3 is a block schematic diagram of a modification of part of FIGURE 1 illustrating a second embodiment of the invention.

Referring to FIGURE 1 of the drawings, the television receiver comprises an antenna system 10, a video signal source 11 which may include a radio frequency amplifier, a first detector, an intermediate frequency amplifier and a second detector, all such components being of conventional construction and being connected in cascade in the well known manner to form a video translating portion of a television receiver. The output from the video signal source 11 is coupled through a conventional video amplifier 12 to the video input of an image reproducing device 13, such as a cathode ray tube. The output from the video amplifier 12 is also coupled to a synchronizing signal separator 14 where the composite synchronizing pulses are separated from the video signal. The separated synchronizing pulses are then amplified in a synchronizing amplifier 15 and reversed in phase to produce a positive going composite series of synchronizing pulses as illustrated in waveforms A and F of FIGURE 2 for odd and even fields of the television receiver scanning system. The composite series of synchronizing pulses comprises horizontal synchronizing pulses 17 of a predetermined duration and having a repetition rate of 15,750 cycles per second, vertical synchronizing pulses containing serrations 18 of a longer duration and equalizing pulses 19 of a shorter duration having a repetition rate of 31,500 cycles per second. The serrations 18 and equalizing pulses 19 that are out of phase with the horizontal synchronizing pulses 17 at the end of the odd or even fields are shown as 18*a* and 19*a* respectively. Another output from the synchronizing amplifier 15 is coupled through a vertical deflection system 16 to the vertical sweep input of the image reproducing device 13. For horizontal synchronization, there is shown a conventional synchronizing splitter 20 adapted to receive synchronizing signals, coupled through an A.F.C. phase detector 21, a horizontal deflection system 22 to the horizontal sweep input of the image reproducing device 13. Part of the saw-tooth waveform developed in the horizontal deflection system 22 is fed back to the phase detector 21 in the conventional manner.

According to the present invention, an R-C differentiator 23 is coupled to the output of the synchronizing amplifier 15 and connected to one input of a coincidence gating means 24. Means responsive to the composite source of synchronizing pulses shown enclosed in the dotted rectangle 25 is also coupled to the output of the synchronizing amplifier 15. The output from the means 25 is coupled to the other input of the coincidence gating means 24, the output of which is coupled to the synchronizing splitter 20. The means 25 comprises an R-C differentiator 26 and a free running multivibrator 27 connected in cascade.

The R-C differentiator 23 produces a series of differentiated pulses from the composite synchronizing pulses of waveforms A and F (FIGURE 2) as shown in waveforms B and G of FIGURE 2 for alternate fields of the television receiver scanning system. The time constant of the R-C differentiator 23 should be no longer than the shortest pulse of the waveforms A or F, that is, no longer than the equalizing pulses 19 so that the differentiated pulses are each of equal duration and contain a small amount of energy.

The R-C differentiator 26 produces a series of triggering pulses (not shown) to lock the phase of the multivibrator to that of the source of composite synchronizing pulses (FIGURES 2A and 2F). The multivibrator 27 should be adjusted to have a natural period slightly larger than one cycle of a series of pulses occurring at the horizontal synchronizing repetition rate. The multivibrator 27 should be further adjusted to produce pulses, each having a duration less than the time of one cycle of a pulse occurring at twice the horizontal synchronizing repetition rate. The first series of pulses produced by the multivibrator 27 is shown in waveforms C and H of FIGURE 2.

The coincidence gating means 24 having received at its inputs, waveforms B and C at the end of the first field and waveforms G and H at the end of the second field, produces at its output a second series of pulses shown in waveforms D and I of FIGURE 2 for the alternate fields. These pulses occur at the repetition rate of the horizontal synchronizing pulses and are in phase therewith. It can be readily seen by comparing waveform A with waveform D and waveform F with waveform I that the out of phase serrations 18*a* and equalizing pulses 19*a* at the end of each field have been eliminated. The output from the gating means 24 consisting of waveforms D and I are then applied to the synchronizing splitter 20.

By so reducing the duration of all the pulses, any noise accompanying the signal will have a greater effect on the horizontal synchronizing control circuit because the noise pulses and the second series of pulses will look more alike. However, particularly where an automatic frequency control circuit is used, a more stable sweeping oscillator output waveform is produced and the voltage developed by the phase detector 21 due to the presence of noise, is self cancelling.

To ensure that the multivibrator starts its cycle exactly at the time the leading edges of differentiated pulses of waveforms B or G reaches one input of the coincidence gating means 24, the multivibrator 27 must be capable of being triggered slightly in advance of the synchronizing information. This is not a serious defect, although it does permit triggering on noise pulses that accompanies the synchronizing information before the arrival of the actual synchronizing pulses. Since the amplitude of noise pulses can be limited to the same amplitude as the synchronizing pulses and the allowable triggering period is only slightly in advance of the arrival of the synchronizing pulses, most noise will be excluded from triggering the multivibrator 27. Noise that does trigger the multivibrator 27 will not affect the exclusion of the out of phase pulses nor will it impair the desired synchronizing information.

In accordance with the second embodiment of the invention illustrated in FIGURE 3, the R-C differentiator 23 of FIGURE 1 is omitted and the output from the synchronizing amplifier 15 coupled directly to one input of the coincidence gating means 24. Thus, waveforms A and C for the odd field and waveforms F and H for the even field are applied to the inputs of the coincidence gating means 24. The output from the gating means 24 would then be as shown in waveforms E and J of FIGURE 2. Where it is desired to preserve the energy of the synchronizing pulses throughout the process, the multivibrator 27 may be adjusted to produce pulses each having a duration equal to the duration of each serration 18. Of course, the nonuniform pulses thus produced would have some effect on the A.F.C. phase detector 21, and it is considered preferable to employ the R-C differentiator 23. It is also possible to adjust the multivibrator 27 to produce pulses each having a duration equal to the duration of each equalizing pulse 19. The pulses of waveforms E and J would then be of equal duration, having the same width as the equalizing pulses 19.

Thus, according to the present invention, there is provided television receiver synchronizing apparatus which permits the horizontal synchronizing control circuit to function properly without being disturbed by serrations of the vertical synchronizing pulses and equalizing pulses that are out of phase with the horizontal synchronizing pulses. This is achieved by removing these pulses from the synchronizing information just prior to the application thereof to the horizontal synchronizing control circuit.

I claim:

1. Synchronizing apparatus for use in a television receiver which includes a source of composite synchronizing pulses and a horizontal synchronizing control circuit for synchronizing a horizontal deflection system, said apparatus being adapted to prevent synchronizing pulses from said source which occur at the repetition rate of and out of phase with horizontal synchronizing pulses at the end of alternate fields from being applied to said horizontal synchronizing control circuit, comprising means responsive to said source to produce a first series of pulses occurring at the horizontal synchronizing repetition rate and being in phase with the horizontal synchronizing pulses of said source, each pulse of said first series having a duration less than the time of one cycle of a pulse occurring at twice the horizontal synchronizing repetition rate, coincidence gating means having two inputs and one output, said gating means being responsive at one input to said source and being responsive at the other input to said first series of pulses to produce a second series of pulses occurring at the horizontal synchronizing repetition rate and being in phase with the horizontal synchronizing pulses of said source, each pulse of said second series having a duration equal to the duration of the shorter pulse applied to said one and other inputs, connections for applying said second series of pulses to said horizontal synchronizing control circuit.

2. Synchronizing apparatus for use in a television receiver which includes a source of composite synchronizing pulses and a horizontal synchronizing control circuit for synchronizing a horizontal deflection system, said apparatus being adapted to prevent synchronizing pulses from said source which occur at the repetition rate of and out of phase with horizontal synchronizing pulses at the end of alternate fields from being applied to said horizontal synchronizing control circuit, comprising differentiating means responsive to said source to produce a series of differentiated pulses at the leading edges of all the pulses of said source, said differentiating means having a time constant no longer than the shortest pulse of said source, means responsive to said source to produce a first series of pulses occurring at the horizontal synchronizing repetition rate and being in phase with the horizontal synchronizing pulses of said source, each pulse of said first series having a duration less than the time of one cycle of a pulse occurring at twice the horizontal synchronizing repetition rate, coincidence gating means having two inputs and one output, said gating means being responsive at one input to said series of differentiated pulses and at the other input to said first series of pulses to produce a second series of pulses occurring at the horizontal repetition rate and being in phase with the horizontal synchronizing pulses of said source, each pulse of said second series having a duration equal to the duration of each differentiated pulse applied to said one input connection for applying said second series of pulses to said horizontal synchronizing control circuit.

3. Synchronizing apparatus according to claim 2 wherein said horizontal synchronizing control circuit comprises an automatic frequency control circuit including a phase detector.

4. Synchronizing apparatus according to claim 2 wherein said means responsive to said source comprises further differentiating means responsive to said source to produce a series of differentiated triggering pulses at the leading edges of all the pulses of said source and a free running multivibrator locked in phase with said triggering pulses and having a natural period slightly longer than one cycle of a series of pulses occurring at the horizontal synchronizing repetition rate.

References Cited by the Examiner

UNITED STATES PATENTS

| | | | |
|---|---|---|---|
| 2,750,498 | 6/56 | Arbuckle | 178—69.5 |
| 3,061,674 | 10/62 | Janssen et al. | 178—69.5 |

OTHER REFERENCES

Fink: "Television Engineering Handbook," McGraw-Hill, New York, 1957; sections 2.4 and 2.705.

DAVID G. REDINBAUGH, *Primary Examiner.*

ROBERT H. ROSE, *Examiner.*